M. J. SCULLIN.
GLASS CUTTER.
APPLICATION FILED JAN. 23, 1918.
1,308,260.
Patented July 1, 1919.
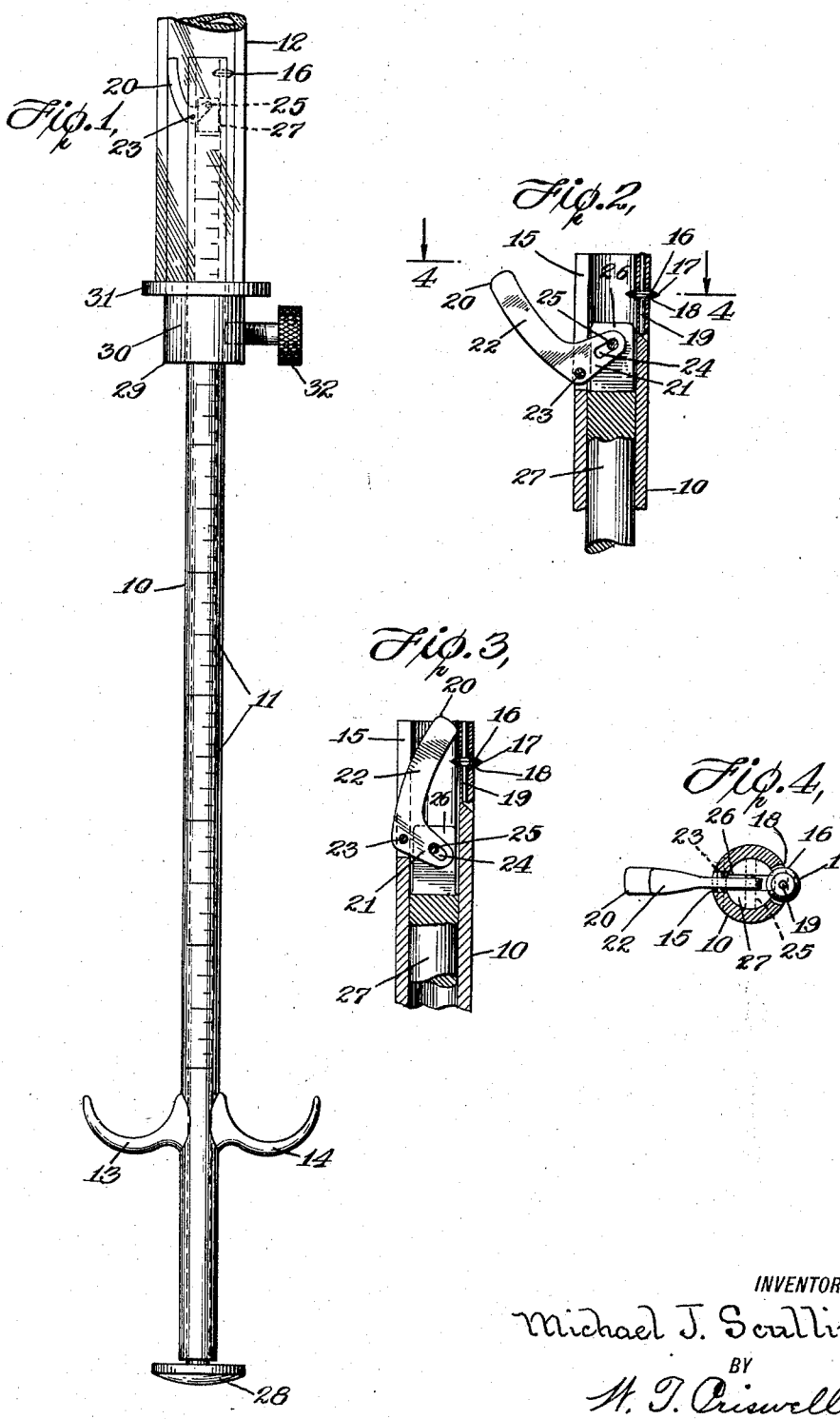
INVENTOR
Michael J. Scullin.
BY
H. T. Criswell.
ATTORNEY ial characters of reference indicate cor-
UNITED STATES PATENT OFFICE.

MICHAEL J. SCULLIN, OF NEWARK, NEW JERSEY.

GLASS-CUTTER.

1,308,260. Specification of Letters Patent. Patented July 1, 1919.

Application filed January 23, 1918. Serial No. 213,330.

*To all whom it may concern:*

Be it known that I, MICHAEL J. SCULLIN, a citizen of the United States, and a resident of Newark, in the county of Essex and State of New Jersey, have invented a certain new and useful Improvement in Glass-Cutters, of which the following is a full, clear, and exact specification.

This invention relates more particularly to a class of cutting devices.

My invention has for its object primarily to provide a device or cutter designed to be employed to permit glass tubes of various sizes and thicknesses to be cut accurately and with facility in different lengths, and which consists mainly of a tubular casing for insertion into a glass tube. Protruding from the casing is a cutter for engaging the inner surface of the tube, and on the casing is a retaining element which is operable for holding the glass tube in movable engagement with the cutter.

Other objects of the invention are to provide means whereby the retaining element may be manually operated; to provide on the casing a stop which is adjustable so that the tubes may be cut in different widths, and to provide a glass cutter of a simple, efficient and durable construction which is susceptible of being made in various sizes and shapes.

A practical embodiment of the invention is represented in the accompanying drawing forming a part of this specification in which similar characters of reference indicate corresponding parts in all the views, the said invention being more fully described hereinafter, and then pointed out in the claim at the end of the description.

In the drawing, Figure 1 is a fragmentary view, showing an elevation of one form of cutter embodying my invention as well as illustrating the manner of its use for cutting glass tubes.

Fig. 2 is an enlarged fragmentary view, partly in detail and partly in section, taken through one end of the device, and which shows the retaining element in an open position.

Fig. 3 is a similar view, showing the presser element in a closed position, and

Fig. 4 is a detail sectional view taken on the line 4—4 of Fig. 2.

The device or glass cutter has a casing 10 which is preferably in the form of a tube of a suitable length, as well as being of any desired diameter, and on the exterior of this tubular casing may be a measuring scale, as 11, which is divided into inches and parts of inches whereby glass tubes, as 12, may be cut in given lengths, as will be hereinafter more fully explained. Projecting in opposite lateral directions from the tubular casing in spaced relation to one of its ends may be two curved fingers, or bars 13 and 14 for serving as a handle, and the opposite end of the casing is slotted lengthwise, as at 15.

Adjacent to the end of the tubular casing 10 in a part thereof which is opposite to the slot 15 is provided a cutter, as 16, for cutting glass tubes. The cutter 16 is preferably of a well known form of a highly tempered steel wheel with its periphery being beveled to a cutting edge, as at 17. The wheel 16 is arranged in an opening 18 so that its cutting edge protrudes exteriorly of the casing for engaging the inner surface of the glass tube, and this wheel is rotatably mounted on a rod or shaft 19 held in the wall of the casing to allow the wheel to be revolved in a direction crosswise of the casing.

In order to permit the glass tube to be held in movable engagement with the cutter 16 for being cut, besides allowing the device to be employed for cutting tubes of various diameters, a retainer element, as 20, is provided. This retaining element is preferably in the form of a substantially L-shaped lever or bar to provide two angularly disposed arms, as 21 and 22, and the lever at the juncture of its arms is pivoted, at 23, to the casing in its slot 15 so that the arm 21 of the lever is disposed interiorly of the casing for being moved back and forth toward and from the slotted end of the casing as well as to allow the arm 22 of the casing to be swung inwardly and outwardly of the slot laterally with respect to the casing.

At the free end of the arm 21 of the lever or retaining element 20 may be a slot or opening 24, and through this slot is disposed a pin or rod 25 provided across the slotted end 26 of a bar or rod 27 for serving as means whereby the retaining element or lever may be manually operated. The bar 27 is movable in the interior of the tubular casing 10. This bar is of a length so that its second end extends beyond the end of the casing opposite to its slot 15, and on the protruding end of the bar may be a head or knob, as 28.

To permit glass tubes to be cut in different lengths by the device, I provide a stop, as 29. The stop 29 has a sleeve 30 which is freely movable on the casing 10 so as to be moved back and forth relative to the cutter 16 as well as being adjusted on the scale 11 to fix the length in which the glass tube must be cut. On the end of the sleeve 30 in opposition to the cutter 16 is a flat annular flange 31 against which the glass tube rests when being cut, and in the wall of the sleeve of the stop is a threaded opening in which is screwed a set screw, as 32, for tightening and loosening the sleeve on the casing.

To cut a glass tube by employing the device, the stop 29, following the release of the set screw 32 with the casing, is adjusted on the casing so that the flange 31 is on alinement with the part of the scale 11 according to the length of the tube which is to be cut. The device is arranged in one hand of the person performing the cutting so that the head 28 of the rod 27 will contact with the palm of the hand while the bars 13 and 14 are engaged by two of the fingers of the person. The glass tube is then guided over the slotted end of the casing as well as over the cutter 16 and over the retaining element or lever 20. By forcing the head 28 with the bar 27 in a direction toward the slotted end of the casing the arm 21 of the lever 20 will be likewise moved, and the arm 22 of this lever will be swung into contact with the inner surface of the tube with the cutter 16. The glass tube on being rotatably moved with proper pressure upon the cutter will then be accurately and quickly cut.

In the foregoing description, I have embodied the preferred form of my invention, but I do not wish to be understood as limiting myself thereto, as I am aware that modifications may be made therein without departing from the principle, or sacrificing any of the advantages of this invention, therefore I reserve to myself the right to make any such changes as fairly fall within the scope thereof.

Having thus described my invention, I claim as new and desire to secure by Letters Patent:—

In a glass tube cutter including a tubular casing with a cutter rotatably protruding therefrom, and having a slot opposite to the cutter, comprising a substantially L-shaped lever with its elbow fulcrumed in the slot of the casing so that one arm of the lever is movable backwardly and forwardly in the passage of the casing, while the second arm is movable inwardly and outwardly of the slot laterally with relation to the casing and the arm of the lever within the casing being slotted, and a rod movable in the casing, having at one of its ends a pin which is movably disposed in the slot of said lever.

This specification signed and witnessed this 22nd day of January, A. D. 1918.

MICHAEL J. SCULLIN.

Witnesses:
E. W. JONES,
C. M. SCHOBER.

Copies of this patent may be obtained for five cents each, by addressing the "Commissioner of Patents Washington, D. C."